(12) United States Patent
Khalil (10) Patent No.: US 11,874,320 B2
(45) Date of Patent: Jan. 16, 2024

(54) DIGITAL TWINS (DT) FOR CIRCUIT BOARD RELIABILITY PREDICTION

(71) Applicant: Rockwell Collins, Inc., Cedar Rapids, IA (US)

(72) Inventor: Yehia F. Khalil, Glastonbury, CT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 121 days.

(21) Appl. No.: 17/563,394

(22) Filed: Dec. 28, 2021

(65) Prior Publication Data

US 2023/0204653 A1  Jun. 29, 2023

(51) Int. Cl.
*G01R 31/28* (2006.01)
*H05K 1/18* (2006.01)
*H05K 3/30* (2006.01)

(52) U.S. Cl.
CPC ......... *G01R 31/2817* (2013.01); *H05K 1/181* (2013.01); *H05K 3/303* (2013.01); *H05K 2201/10151* (2013.01); *H05K 2201/10159* (2013.01)

(58) Field of Classification Search
CPC .... G01R 31/2817; H05K 1/181; H05K 3/303; H05K 2201/10151; H05K 2201/10159
USPC .................................................... 324/763.01
See application file for complete search history.

(56) References Cited

U.S. PATENT DOCUMENTS

2020/0226742 A1* 7/2020 Sawlani ............ H01L 21/67288
2021/0264076 A1   8/2021 Yamamoto et al.

FOREIGN PATENT DOCUMENTS

WO      2021154747 A1    8/2021

OTHER PUBLICATIONS

Peck, D.S.; "New concerns about integrated circuit reliability," Electron Devices, IEEE Transactions on, vol. 26, No. 1, pp. 38-43, Jan. 1979.
URL: https://accelonix.nl/electronic-industry-4-0-digital-twin-for-pcb-assembly-and-test-powered-by-testway/, Jul. 17, 2020, "Electronic Industry 4.0: Digital Twin for PCB Assembly and Test Powered by TestWay", Accelonix Services, 5 pages.

(Continued)

*Primary Examiner* — Farhana A Hoque
(74) *Attorney, Agent, or Firm* — Suiter Swantz pc llo (57) ABSTRACT

A system and method for performing time-dependent reliability prediction of a printed circuit board (PCB) embedded in a sensor that monitors the health (viz., performance) of operating equipment subject to different environmental stressors. The method includes developing a digital twin (DT) of the physical PCB, generating sensor data, transmitting the sensor data, and receiving sensor data and historical conditional data by the twinning module, wherein the historical condition data includes known failure data of one or more electronic components of the circuit board based on an internal condition or and external condition. The method further includes embedded physics-based reliability models informed by inputs from the sensor data and the historical conditional data, generating a real-time failure prediction signal based on the physics-based reliability models, and reporting the real-time failure prediction signal. The circuit board may include printed circuit boards (PCBs), particularly additively-manufactured printed circuit boards (AM-PCBs).

13 Claims, 7 Drawing Sheets

(56) References Cited

OTHER PUBLICATIONS

URL: https://www.plm.automation.siemens.com/global/en/resource/pcb-systems-design-using-digital-twin/88108, Downloaded Oct. 29, 2021, Siemens, "PCB systems design using the Digital Twin for reliable, safe electric and autonomous vehicle development", 2 pages.
URL: https://www.tempoautomation.com/blog/the-benefits-of-using-digital-twins-in-pcb-design/, Video Presentation, Downloaded Oct. 29, 2021, "The Benefits of Using Digital Twins in PCB Design", 5 pages.
Extended European Search Report dated May 12, 2023; European Application No. 22211657.6.
Jie Gu et al: "Health assessment and prognostics of electronic products", Reliability, Maintainability and Safety 2009. ICRMS 2009, 8th International Conference on, IEEE, Piscataway, NJ, USA Jul. 20, 2009, pp. 912-919.
Jie Gu et al: "Predicting the Reliability of Electronic Products", Electronic Packaging Technology, 2007. ICEPT 2007, 8th International Conference on, IEEE, PI, Aug. 14, 2007, pp. 1-8.
Prisacaru Alexandru et al: Prognostics and health monitoring of electronic system: A review, 2017 8th International Conference on Thermal, Mechanical and Multi-physics Simulation and Experiments in Microelectronics and Microsystems (Eurosime), IEEE, Apr. 3, 2017, pp. 1-11.

\* cited by examiner

FIG.7

DIGITAL TWINS (DT) FOR CIRCUIT BOARD RELIABILITY PREDICTION

BACKGROUND

Circuit boards such as printed circuit boards (PCBs) are commonly used in electronic devices (e.g., sensors) for prognostic health monitoring (PHM) of equipment (such as pumps, electric motors, structures, etc.) used in industrial applications like chemical manufacturing plants, aerospace (such as the traditional commercial aircraft and the emerging hybrid-electric and all-electric aircraft), etc. Although large scale production of PCBs is commonplace, the initial design and prototyping of a PCB can be costly, arduous, time consuming, and it can be difficult to ascertain the reliability of a PCB design under different operating conditions, or how the reliability of a PCB changes upon design modification. Furthermore, PCB reliability is difficult to ascertain in the field, as the PCB operating life may be affected by several environmental stressors, causing failure of the devices and components that contain the PCB. Therefore, it is desirable to develop a methodology that avoids the shortcomings of conventional approaches to PCB reliability determination.

SUMMARY

A method for predicting the time-dependent reliability of a circuit board is disclosed. In one or more embodiments, the method includes assembling one or more sensors on a circuit board. In one or more embodiments, the method further includes generating sensor data. In one or more embodiments, the method further includes transmitting the sensor data. In one or more embodiments, the method further includes receiving sensor data and historical conditional data by a circuit board status unit, wherein the historical condition data includes known failure data of one or more components of the circuit board based on an internal condition or and external condition. In one or more embodiments, the method further includes generating physics-based reliability predictions informed by inputs from the sensor data and the historical conditional data. In one or more embodiments, the method further includes generating a real-time failure prediction based on empirical physics-based reliability models. In one or more embodiments, the method further includes reporting the real-time failure rate predictions.

In some embodiments of the method, the method further includes receiving virtual environmental data (called environmental stressors) under which the PHM sensors are operating to generate real-time predictions of potential PHM sensor's failure or PHM sensor's performance degradation below pre-determined time-based acceptable failure probability. The input environmental data (such as random vibrations, harmonic vibrations, temperature, pressure, humidity levels, etc.) are used in algorithms containing empirical physics-based PCB reliability models to predict the reliability of the PHM sensors used for monitoring equipment health over time. The monitored equipment could be operating pumps, electric motors, and other unit operations used in the chemical process industry or equipment typically used in the aerospace industry including aircraft.

In some embodiments of the method, the circuit board is configured as a printed circuit board (PCB).

In some embodiments of the method, the printed circuit board (PCB) is configured as an additively manufactured printed circuit board (AM PCB).

In some embodiments of the method, the PHM sensor data includes at least one of the environmental stressors such as temperature data, vibration (random or harmonic) data, pressure, and humidity level data.

In some embodiments of the method, the physics-based reliability models represent empirical correlations verified and validated historical field failure data. Machine learning (ML) techniques are used to determine the proper empirical correlation to be used in PCB reliability predictions based on the type of input environmental stressor data.

In some embodiments of the method, the real-time failure prediction is generated in part via empirical or conventional physics of failure models embedded in the digital twin (DT) algorithm.

In some embodiments of the method the real-time failure prediction predicts the failure of an additively manufactured printed circuit board (AM PCB).

A system is also disclosed. In one or more embodiments, the system includes a circuit board that includes one or more electronic circuits and one or more sensors (e.g., sensor networks) configured to transmit equipment PHM data. In one or more embodiments, the system further includes a prediction module communicatively coupled to the one or more sensors that includes one or more processors. In one or more embodiments, the status prediction unit further includes a memory communicatively coupled to the one or more processors, having instructions stored therein that, when executed by the one or more processors cause the status prediction unit to perform the instructions. In one or more embodiments one of the instructions includes receiving sensor data and historical conditional data, wherein the historical condition data includes known failure data of one or more components of the circuit board based on an internal condition or and external condition. In one or more embodiments one of the instructions includes generating a physics-based reliability predictions informed by inputs from the sensor data and the historical conditional data. In one or more embodiments one of the instructions includes generating a real-time failure prediction signal based on the physics-based reliability models. In one or more embodiments, one of the instructions includes reporting the real-time failure predictions.

In some embodiments of the system one of the instructions includes receiving virtual test data and generating a real-time failure prediction signal based on the physics-based reliability model and the virtual test data.

In some embodiments of the system, the system further includes a twinning module configured to generate the physics-based reliability predictions, wherein the physics-based reliability models are formed from the sensor data and the historical conditional data via machine learning (ML) techniques.

In some embodiments of the system, the system's circuit board is configured as an additively manufactured printed circuit board (AM PCB), wherein the sensor data includes humidity data.

In some embodiments of the system, the real-time prediction signal predicts the corrosion of a line of conductive ink on the additively manufactured printed circuit board.

In some embodiments of the system, one or more components of the status prediction unit is disposed on the circuit board.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or, for example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A framework for providing a digital twin of a printed circuit board (PCB), is disclosed. Typically, PCB performance and reliability testing is labor intensive and costly to conduct. Laboratory-based performance and reliability testing requires not only testing equipment (e.g., humidity chambers and vibration test rigs), but also require a minimum number of the units on test in order to establish statistically significant results. The framework provides time-dependent reliability prediction, prognostic health monitoring, and/or maintenance scheduling. The framework includes one or more circuit board sensors integrated into a circuit board for measuring internal and external stresses that that occur during operation of the circuit board, and a digital twin that correlates data from the sensors with known failure rates of board components. This framework provides a prediction of circuit board failures in the field, and may also be used in the circuit board design phase. The framework may be used for any type of circuit boards including but not limited to printed circuit boards (PCB), printed wiring boards (PWB), and breadboards. For example, the framework may be configured for additively-manufactured PCBs (AM-PCB).

Figure 1:
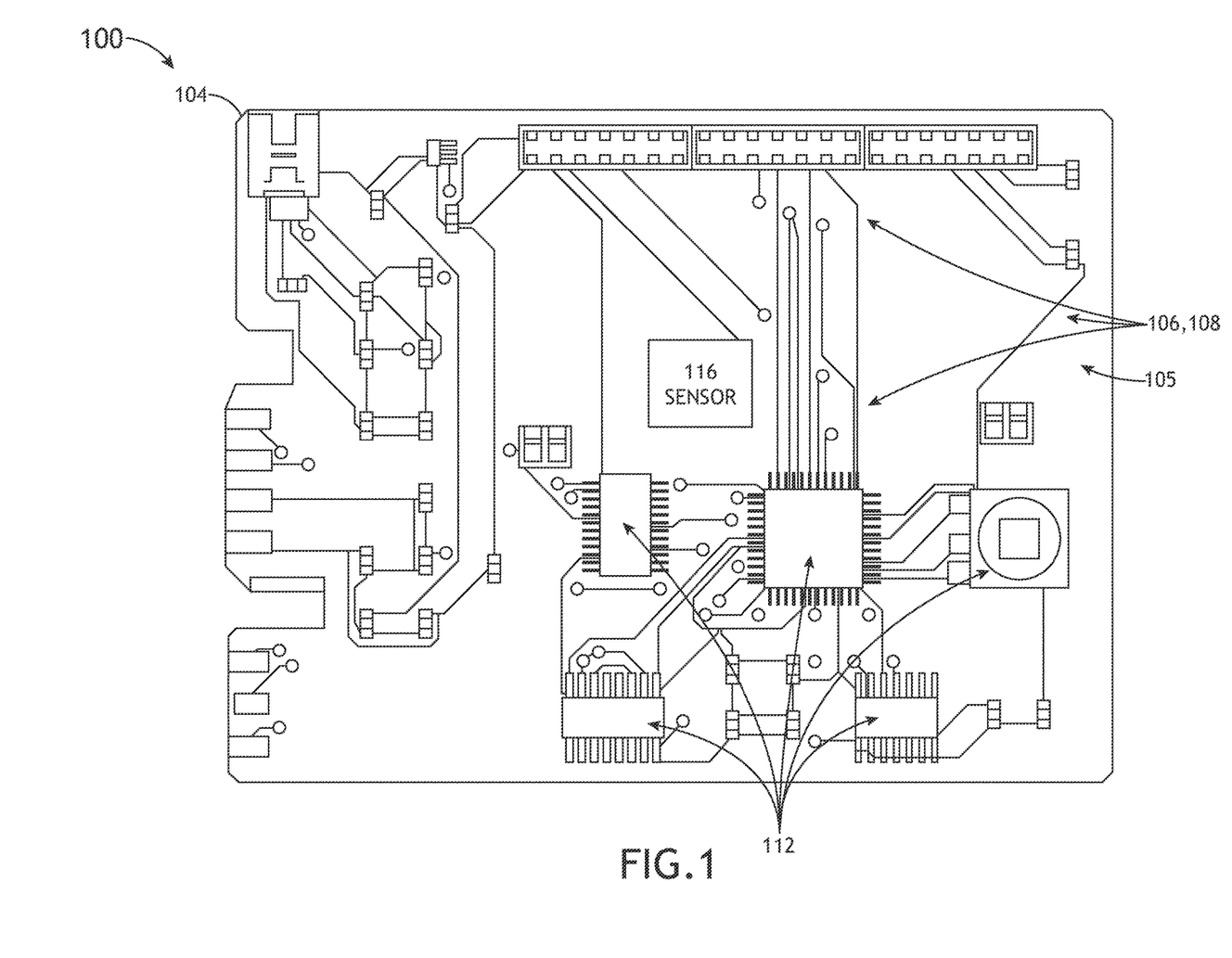
FIG. 1 is a diagram of a PCB, in accordance with one or more embodiments of the disclosure.

FIG. 1 is a diagram of a PCB 104 (e.g., an AM-PCB or a conventional PCB), in accordance with one or more embodiments of the disclosure. The PCB 104 includes a substrate 105 configured with multiple traces 106 or lines of conductive ink 108 drawn on top of the surface of the substrate 105, electrically coupling components of the PCB 104. The substrate 105 may be formed of any type of material used for PCB 104 production including but not limited to an epoxy board. For example, the substrate may be configured as an FR4 epoxy board. The conductive ink may be configured as any type of ink used in additive manufacturing of electronic circuitry including but not limited to silver conductive ink.

The PCB 104 may contain one or more integrated circuits (IC) 112 communicatively coupled by the conductive ink 108 that carry out the various functions of the PCB (e.g., memory ICs, CPUs, etc.) The PCB 104 may contain other componentry that carry out specific functions including but not limited to LED light, a camera, memory, I/O components, and other circuitry. In particularly, the PCB may one or more sensors 116.

In embodiments, the one or more sensors 116 are configured to sense one or more conditions of, or adjacent to, the PCB 104 and generate sensor data. For example, the one or more sensors 116 may be configured to sense external conditions (e.g., external environmental conditions that affect the PCB 104). For instance, one or more external sensors 116 may include but are not limited to humidity sensors, radiation sensors (e.g., light sensors, x-ray sensors), ambient temperature sensors and pressure sensors). In another example, the one or more sensors may be configured to sense internal conditions. For instance, one or more internal sensors may include but not be limited to vibration sensors (e.g., harmonic vibration or random vibration), stress (high-cycle or low-cycle fatigue) sensors (e.g., sensors that detect bending or distortion of the substrate 105), mechanical shock sensors, internal temperature sensors (e.g., temperature sensors that measure heat dissipation from CPU usage), temperature cycling sensors, and moisture sensors.

In some embodiments, the one or more sensors 116 may be configured to detect run-time conditions of the PCB. For example, the one or more sensors 116 may be configured to detect the ON/OFF status of the PCB (e.g., whether the PCB is currently operating under an electrical load). In another example, the one or more sensors 116 can detect current and/or voltage along one or more traces 106 of circuitry. In another example, the one or more sensors 116 can determine the number of cycles (e.g., clock cycles) of one or more components of the PCB. For instance, the one or more sensors 116 may detect the clock cycles of a CPU. The one or more sensors 116 may be communicatively coupled to one or more circuits within the PCB 104, or may be standalone components that communicates independently (e.g., wirelessly) to transmit data.

Figure 2:
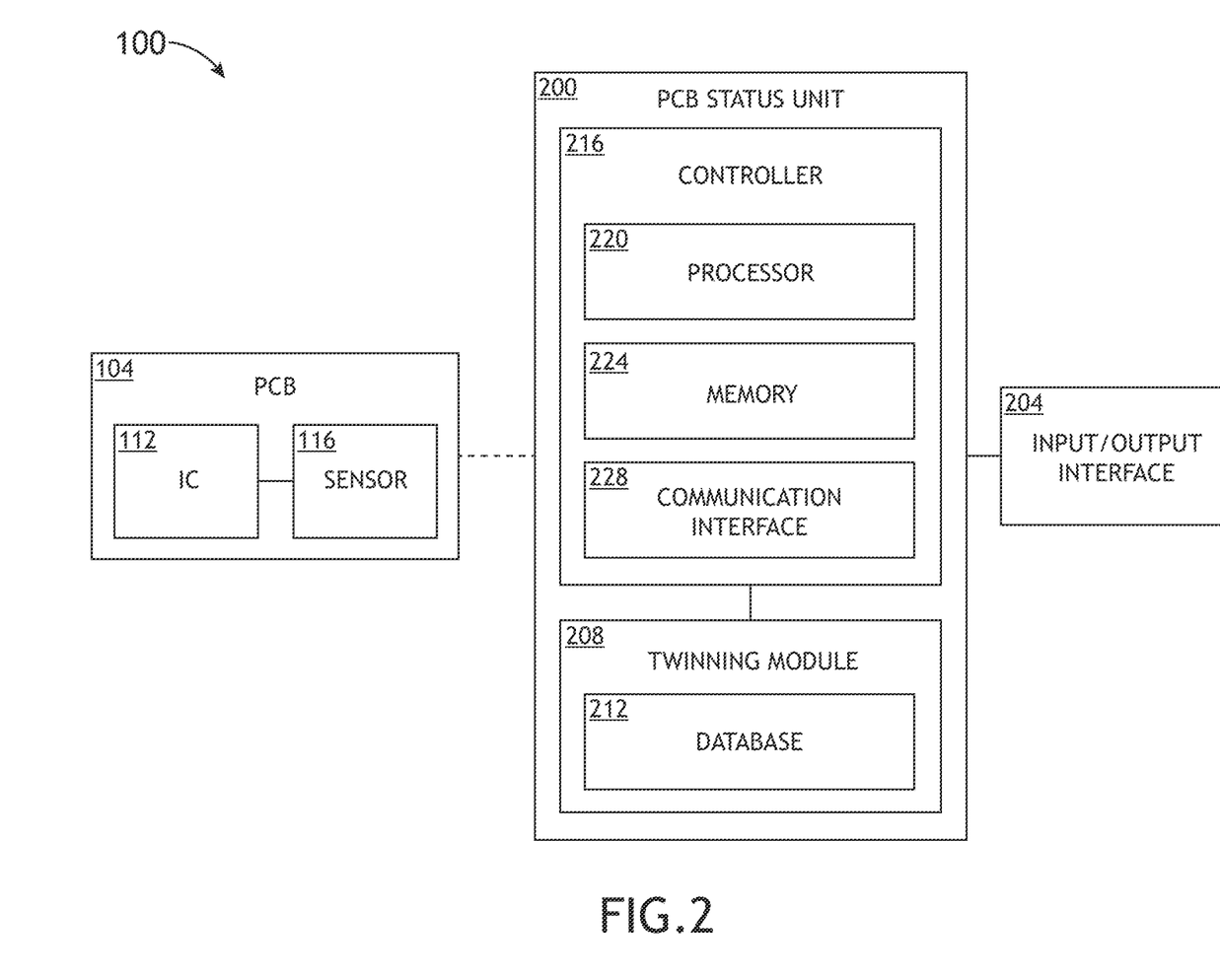
FIG. 2 is a block diagram illustrating the components of a PCB status unit communicatively coupled to the PCB, in accordance with one or more embodiments of the disclosure.

FIG. 2 is block diagram illustrating the components of a PCB status unit 200 communicatively coupled to the PCB 104, in accordance with one or more embodiments of the disclosure. The PCB status unit 200 is particularly linked to the one or more sensors 116 integrated into the PCB 104, and receives data from the one or more sensors 116 to generate a real-time failure prediction signal, which is transmitted to a user or external control system via an input/output (I/O) interface 204. The I/O interface 204 may contain any type of input/output technology configured to transmit data to and from the PCB status unit. For example, the I/O interface may be configured as user interface componentry including but not limited to a display, a keyboard, a mouse, a graphical user interface (GUI), or a touchscreen. In another example, the I/O interface may be configured as a data transmission port to a wireless or wireline network.

The PCB status unit 200 includes a twinning module 208 that integrates data from the one or more sensors 116 with electronics maintenance history and available historical data (e.g., field failure data) made available in a database 212 (e.g., a collection of data files in the PCB status unit 202 to produce a digital twin model. The digital twin model virtually and continuously forecasts the health of the PCB 104, and forecasts the remaining life of the PCB 104 and potential anomalies. The twining module 208 may be configured as a software executed module, a hardware executed module, a firmware executed module, or a hybrid module executed by software, hardware, and/or firmware. For example, the twinning module may be a software program executed by one or more processing units within the PCB status unit 200. The PCB status unit 200 also includes a controller 216 communicatively coupled to one or more components of the PCB status unit 200, the PCB 104, and/or the I/O interface 204, and configured to perform the functionality performed within. The controller 216 may include one or more processors 220, memory 224, and a communication interface 228.

The one or more processors 220 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 220 may include any device configured to execute algorithms and/or instructions (e.g., program instructions stored in memory). In one embodiment, the one or more processors 220 may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 224 can be an example of tangible, computer-readable storage medium that provides storage functionality to store various data and/or program code associated with operation of the controller 130 and/or other components of the system 100, such as software programs and/or code segments, or other data to instruct the controller and/or other components to perform the functionality described herein. Thus, the memory can store data, such as a program of instructions for operating the system 100 or other components. It should be noted that while a single memory 224 is described, a wide variety of types and combinations of memory 224 (e.g., tangible, non-transitory memory) can be employed. The memory can be integral with the controller, can comprise stand-alone memory, or can be a combination of both. Some examples of the memory 224 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 228 can be operatively configured to communicate with components of the controller 130 and other components of the system 100. For example, the communication interface 228 can be configured to retrieve data from the controller 130 or other components, transmit data for storage in the memory 224, retrieve data from storage in the memory 224, and so forth. The communication interface 228 can also be communicatively coupled with controller 130 and/or system elements to facilitate data transfer between system components.

Figure 3:
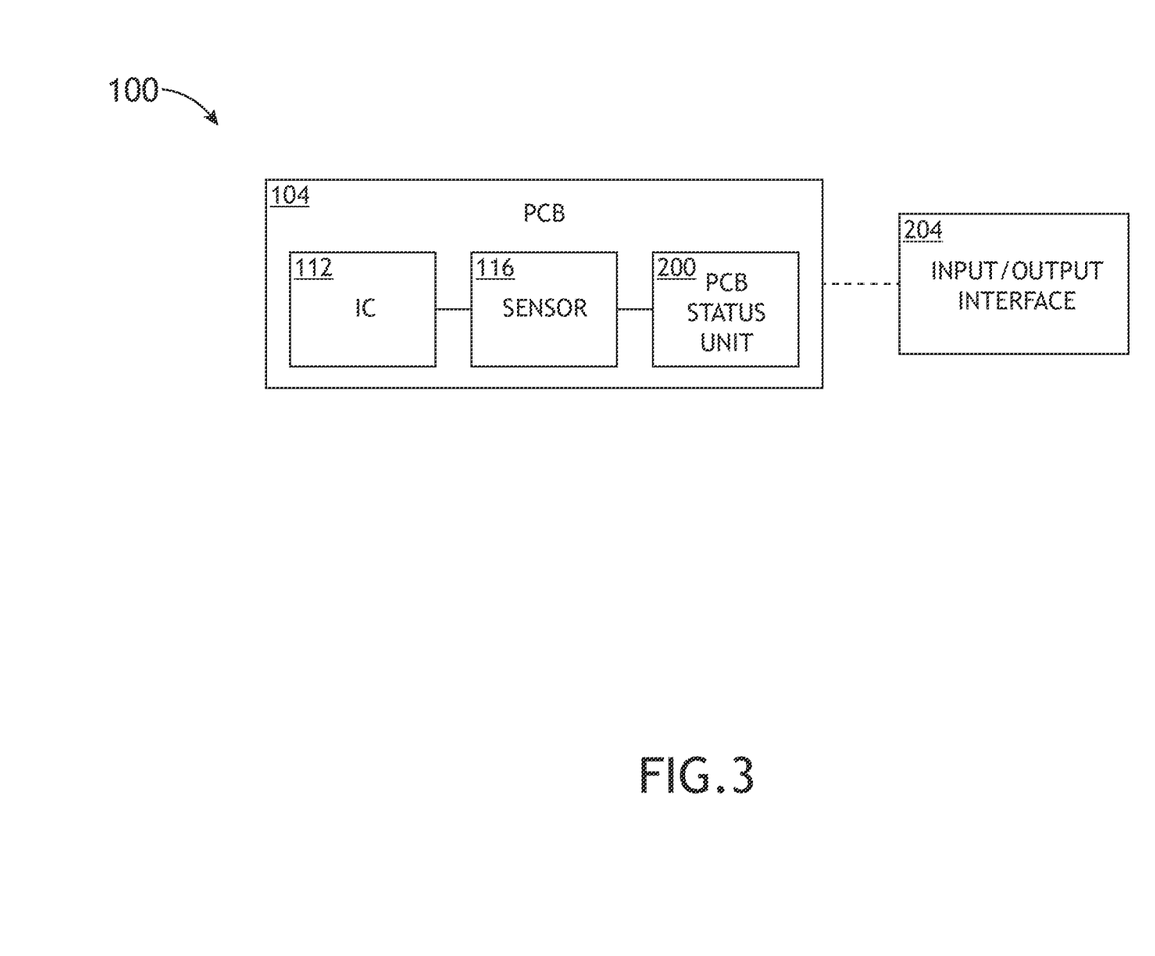
FIG. 3 is a block diagram illustrating the components of a PCB status unit disposed on the PCB, in accordance with one or more embodiments of the disclosure.

In some embodiments, one or more components of the PCB status unit 200 is included within the PCB 104, as shown in FIG. 3, in accordance with one or more embodiments of the disclosure. For example, the one or more processors 220 may be configured as one of the one or more integrated circuits 112 disposed on the PCB 104. For instance, sensor data from the one or more sensors 116, may be communicatively coupled to the one or more processors 220 via one or more circuits (e.g., traces 106 of conductive ink 108 for an AM-PCB). The generated real-time failure prediction signal may then be processed by the on-PCB PCB status unit 200 and then transmitted to the I/O interface via a wireless or wireline technology. Several implementations are possible with one or more components of the PCB status unit 200 disposed on the PCB. For example, sensor data from the one or more sensors 116 may be temporarily stored on memory 224 located on the PCB 104, which is later transmitted to other componentry of the PCB status unit that is located away from the PCB 104. Therefore, the above description should not be interpreted as a limitation on the embodiments of the present disclosure but merely as an illustration.

Figure 4:
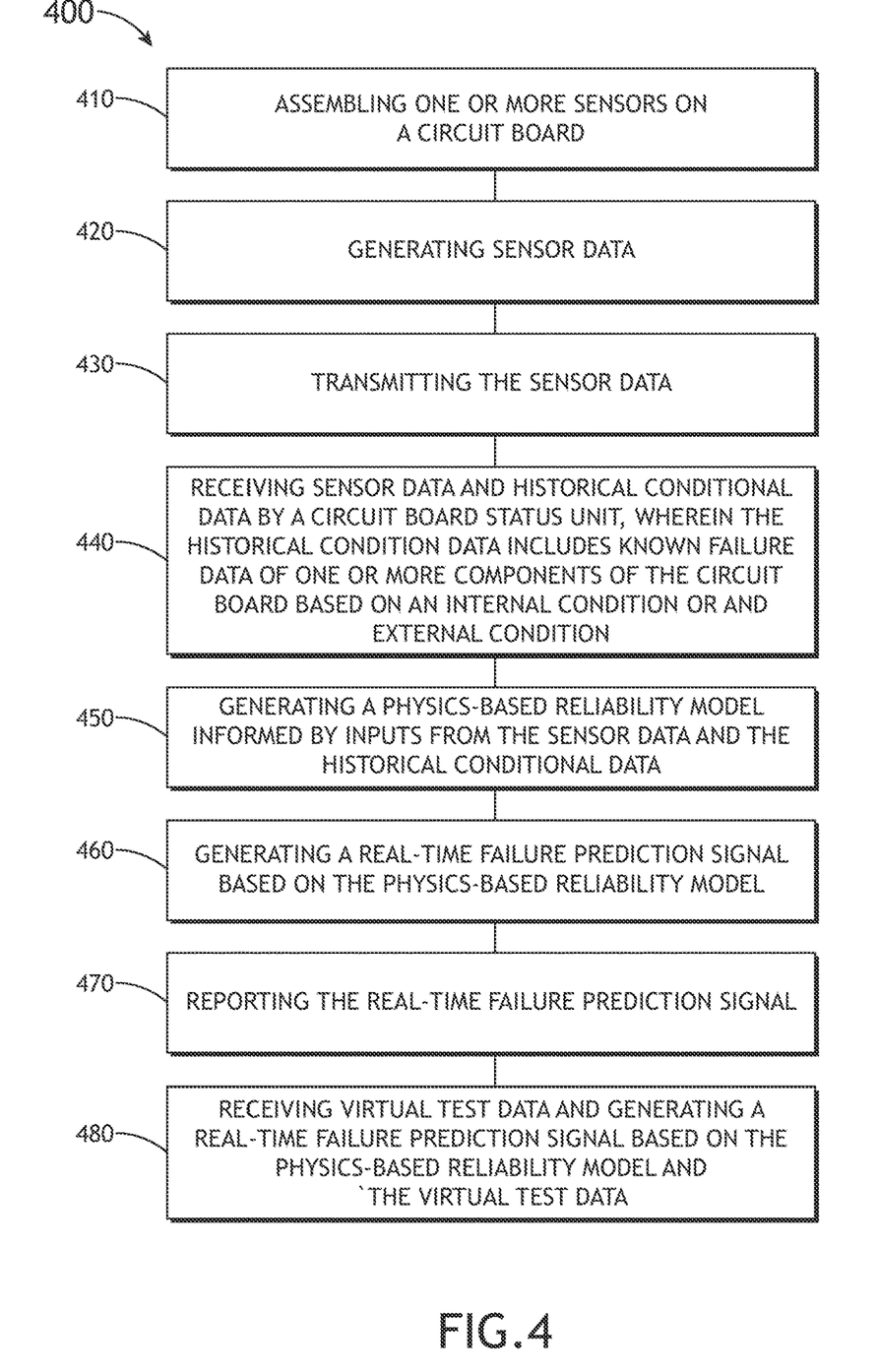
FIG. 4 is a flowchart illustrating a method for creating a framework for PCB reliability prediction and prognostic health monitoring (PHM); in accordance with one or more embodiments of the disclosure.

FIG. 4 is a flowchart illustrating a method 400 for creating a framework for PCB 104 reliability prediction and prognostic health monitoring (e.g., prediction operations), in accordance with one or more embodiments of the disclosure. The method 400 includes steps for the creation of a sensor-monitored PCB 104 as well as the step for developing a digital twin that can facilitate reliability prediction and prognostic health monitoring.

In some embodiments, the method 400 further includes a step 410 of assembling one or more sensors 116 on a circuit board. The circuit board be any type of circuit board as described herein including but not limited to the PCB 104. For instance, the circuit board may be configured as an AM-PCB. The one or more sensors 116 may include any sensor technology as described herein may be assembled utilizing any technology including but not limited to printing, or additively manufactured, technology.

Figure 5:
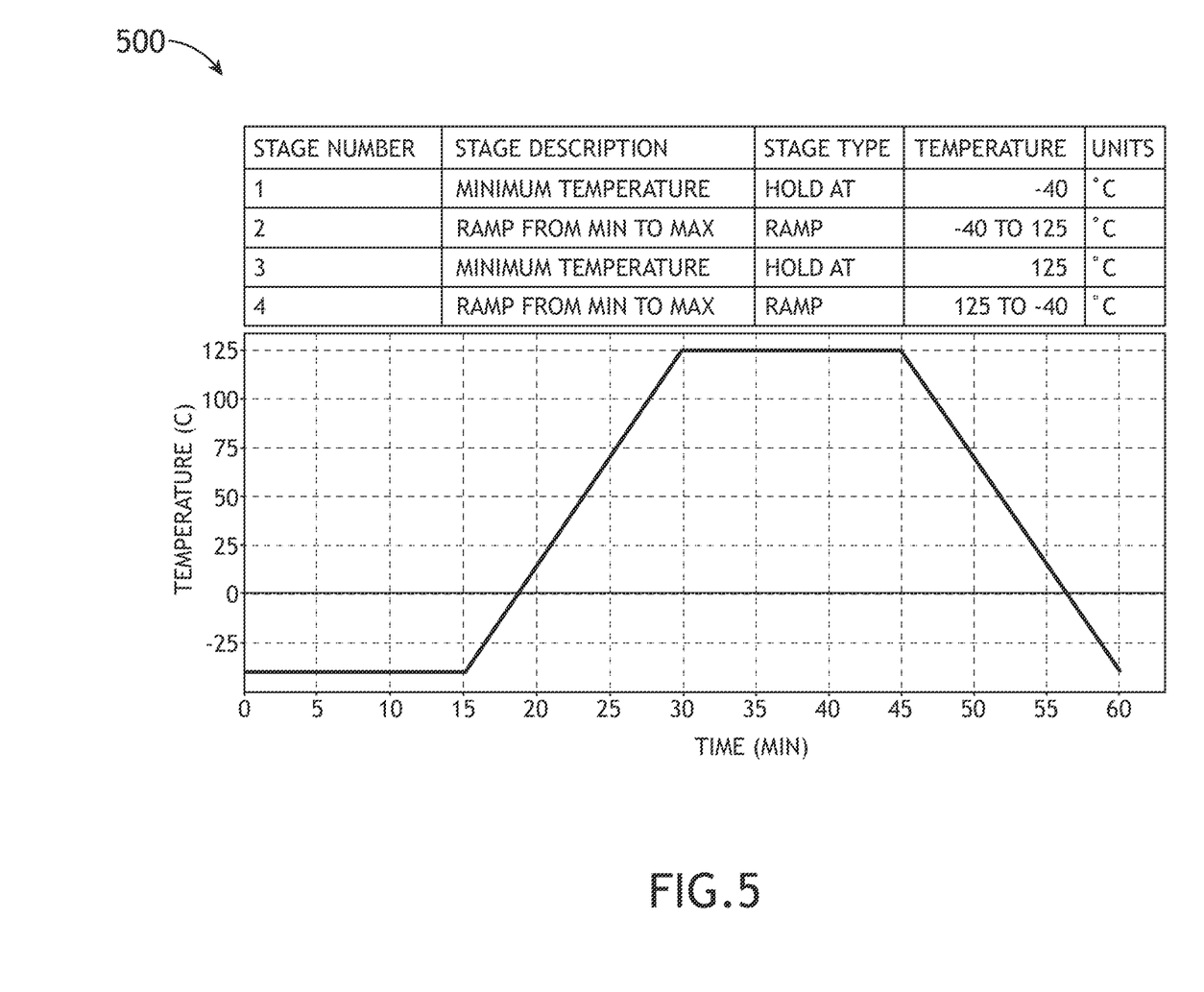
FIG. 5 is a diagram illustrating temperature numerical data and a graph plotting temperature as a function of time, in accordance with one or more embodiments of the disclosure.

In some embodiments, the method 400 further includes a step 420 of generating sensor data. The sensor data is generated via the one or more sensors and includes data from any type of sensor as described herein. For example, the sensor data may be configured as a temperature sensor that generates temperature data, as detailed in a graph 500 illustrated in FIG. 5, in accordance with one or more embodiments of the disclosure. For example, a temperature sensor may generate temperature data in specific time intervals (e.g., minutes) that when collected over time, produces the graph data, facilitating the calculation of minimum/maximum temperatures over time, ramping times, and other temperature characteristics.

In some embodiments, the method 400 further includes a step 430 of transmitting the sensor data. For example, the step 430 may include transmitting the sensor data to the memory 224 of the PCB status unit 200, the database 212, or other memory component. In another example, the step 430 may include transmitting the sensor data to a sensor-specific storage component on the PCB that then relays the sensor data to the PCB status unit 200 in a time-defined manner. For example, the sensor-specific storage component may continuously collect data from the specific sensor 116 for one-minute, then transmit the data collected in that one minute to the PCB status unit 200.

In some embodiments, the method 400 further includes a step 440 of receiving sensor data and historical conditional data by a circuit board status unit (e.g., PCB status unit 200), wherein the historical condition data includes failure data of one or more components of the circuit board (e.g., PCB 104) based on an internal or external condition. For example, the PCB status unit 200 may receive sensor data from a temperature sensor, and historical condition data (e.g., loaded into the database via the I/O interface 204) that includes failure rates of traces 106 of conductive ink 108 after many temperature cycles. In another example, the PCB status unit 200 may receive sensor data from a vibration sensor, and historical condition data that includes failure rates of a CPU after vibrational stress.

In some embodiments, the method 400 further includes a step 450 of generating a physics-based reliability model informed from by inputs from the sensor data and the historical conditional data. For example, the twinning module 208 may take the sensor data and historical conditional data and apply artificial intelligence (AI) algorithms (e.g., machine learning models, machine learning techniques, or neural networks) and/or other analyses to develop a digital twin model that can predict failures of a PCB 104 and PCB componentry. For instance, the digital twin model may facilitate the ability of a user to replace a PCB in a communication system before the PCB fails. In particular, the user utilizing the digital twin model may be prompted to replace the PCB before the PCB fails, but not before the use has utilized the PCB to the fullest extent possible. In another instance, the digital twin model may be utilized for design purposes, by allowing a series of prototype PCBs 104 to be constructed virtually and analyzed for predicted rates of component failure based on field data collected from the one or more sensors 116 of previous designs.

In some embodiments, the twinning module 208 uses machine learning to build a failure model through the incorporation of failure data (e.g., failure field data), training the model. The model may include data from a variety of different sources, including failure data from circuit boards, individual components of circuit boards, and systems using multiple circuit boards. Once trained, the model may then be used to make predictions regarding PCB failure and generate alerts and other directives without being explicitly programmed to do so.

It should be understood that the physics-based reliability model may be configured as a stand-alone model or as an updateable model. For example, the physics-based reliability model may be configured as a well-established model that not modified by data generated by the method 400 and/or system 100, but rather uses the data generated by the method 400 and/or system 100 to calculate physics-based reliability predictions. In another example, the physics-based model may be a learning model that is updates upon the input of data from the method 400 and/or system 100 to calculate physics-based reliability predictions.

In some embodiments, the physics-based reliability model may further be developed through 3D finite element analysis (3D FEA). For example, the PCB 104 may be modeled as a collection of subdomains (e.g., PCB coordinate areas or individual components), each represented by a set of element equations which are then systematically recombined into a global system of equations that model the entire PCB (e.g., the model having received field failure data from the database 212).

In some embodiments, the physics-based reliability model may further be developed through, or include, physics of failure (PoF) modeling, which leverages the knowledge and understanding of the processes and mechanisms that induce failure to predict reliability and improve product performance. In this manner, the real-time prediction signal may be generated at least in part via the PoF model. PoF has been extensively developed for integrated circuit and electronic packaging design for performance predictions based on environment factors such as temperature and humidity. An example of PoF modeling for integrated circuits may be found in Peck, D. S.; "New concerns about integrated circuit reliability," Electron Devices, IEEE Transactions on, vol.

26, no. 1, pp. 38-43, January 1979, which has been incorporated by reference in its entirety. Other examples of PoF modeling that can be applied to integrated circuits include the well-established Arrhenius model for time to failure due to thermal effects, and the Coffin-Manson model for time to failure via Thermo-mechanical mechanisms.

Figure 6:
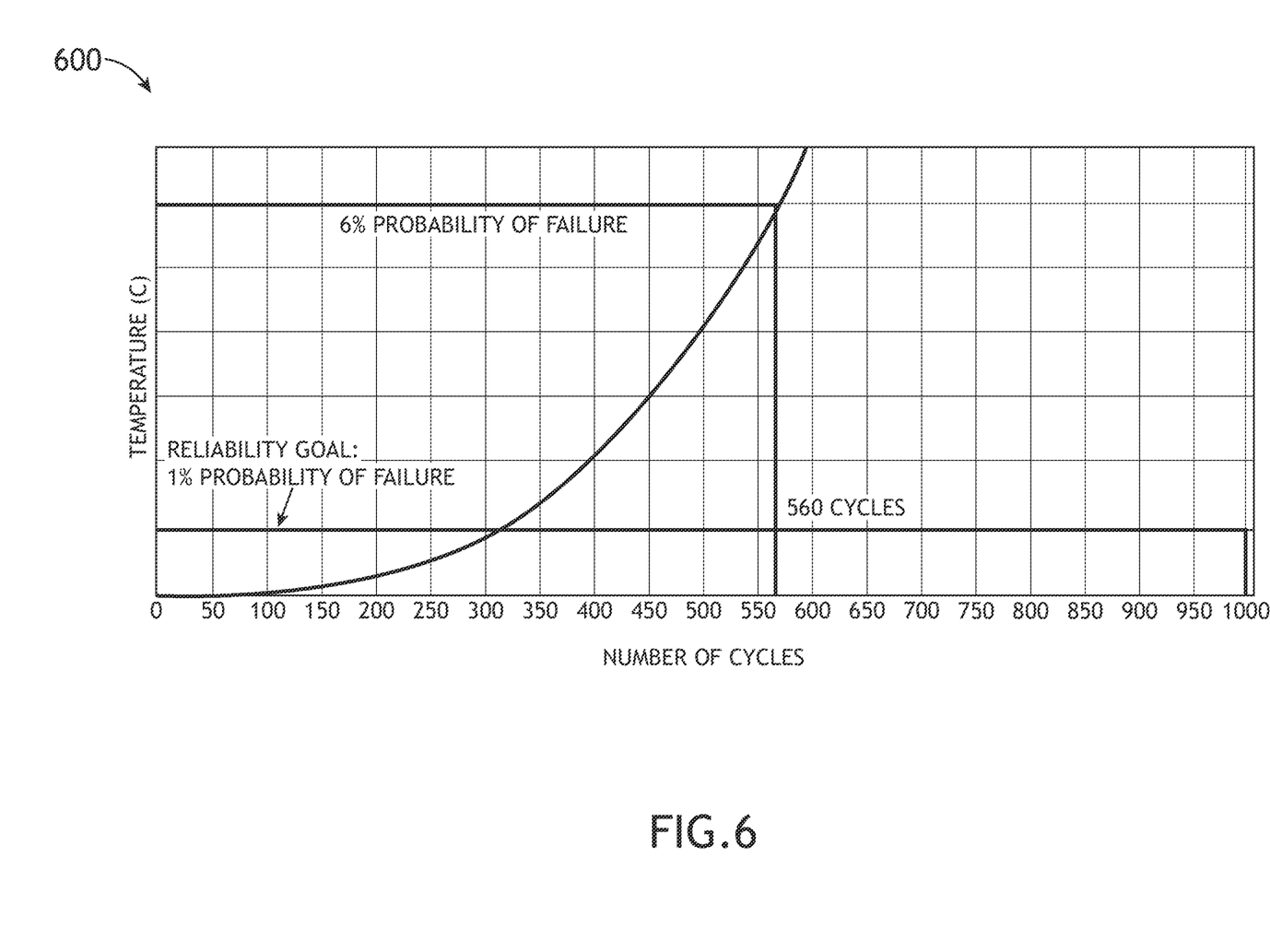
FIG. 6 is a graph illustrating a probability of failure of a PCB component as a function of number of cycles, in accordance with one or more embodiments of the disclosure.

An example result of PoF modeling is shown represented by a graph 600 in FIG. 6, in accordance with one or more embodiments of the disclosure. As shown in the graph 600, an increase in the probability of failure increases non-linearly with time, reaching a 6% probability of failure after 560 cycles (e.g., temperature cycles), whereas a 1% probability of failure occurs at approximately 325 cycles. If a 1% probability of failure of the component described in graph 600 is considered low risk, and a 6% percent probability of failure of the component described in graph 600 is considered high risk, then the model described in graph 600 may suggest that the component be replaced between 325 and 560 cycles.

Multiple PoF analyses from different sensor types or componentry may be combined, forming a more accurate and complete analysis. For example, an overall PoF analysis may combine one or more PoF analyses that consider one or more factors (e.g., modes of failure) including but not limited to solder failure, component failure, harmonic failure fatigue, mechanical shock, plated through hole (PTH) fatigue, random vibration fatigue, and semiconductor wear-out.

In some embodiments PoF as a function of time for each failure mode may be computed using the 2-parameter Weibull model, with the characteristic life ($\eta$) and the shape parameter ($\beta$). For example, the characteristic life ($\eta$) is computed from PoF algorithms, whereas the shape parameter ($\beta$) us assumed based on the determination by the user. Failure data used in Weibull analysis may then be generated using either PoF methods of probabilistic methods. An example result of utilizing the Weibull model to provide a failure-mode-dependent probability as a function of PCB life-time is illustrated as a graph in FIG. 6, in accordance with one or more embodiments of the disclosure.

In some embodiments, the PoF model includes a Ball Grid Array (BGA) model used for packages configured with a grid pattern on a connection side made of solder balls. For example, the BGA model may facilitate the prediction of damage to solder joints in BGAs due to temperature cycling, electric coupling conditions, and other environmental stressors. The BGA model may be valid for wire bonded BGAs, flip chip BGAs, and ceramic ball grid arrays (CBGAs). PoF models may also include models for column grid arrays (CGAs) and CGA components, and models for leaded ceramic chip carriers (LCCCs).

In some embodiments, the PoF model includes models specific for packages or integrated circuits (ICs) with leads (e.g., a leaded model). The leaded model may be use for leaded components of any geometry including but not limited to C-Leads, J-Leads, L-Leads, Gullwing Leads and Stub Leads. The PoF model may also include models for leadless components. For example, the PoF model may include a model for quad flat no-lead (QFN) components and/or dual flat no-lead (DFN) components (e.g., components configured with pins around the perimeter of the package. The PoF model may also include a through-hole model, which may be used for any components attached to the circuit board using leads soldered into through-holes rather than surface mounting.

In some embodiments, the method 400 further includes a step 460 of generating a real-time failure prediction signal based on the physics-based reliability model. The real-time failure prediction signal is generated in conjunction with the twinning module 208 and may be configured as a video signal to be sent to the I/O interface 204 configured as a display. The real-time failure prediction signal may be configured as any type of display signal or image such as a simple data graph 500, as demonstrated in FIG. 5, as a probability of failure analysis graph 600, as demonstrated FIG. 6, or as an alerting graphic. The method 400 further includes a step 470 of reporting the real-time prediction signal (e.g., to the display, the GUI, or other input/output device).

In some embodiments, PCB status unit 200 is configured to generate a real-time failure prediction signal based on one or more sensors 116 configured to measure indirect environmental characteristics or stressors of the PCB. For example, corrosion of the one or more traces 106 or lines of conductive ink 108 of an AM-PCB may be determined indirectly through a humidity sensor, as the PCB status unit 200 may predict the corrosion state of the traces 106 or lines of conductive ink 108 based on the detected levels of humidity over time. In another example, an inertial sensor may be integrated into the PCB 104 on-board an aircraft to indicate when the aircraft is in flight, and the PCB 104 is known to have specific vibrational stresses when the aircraft is inflight. For instance, the PCB 104 on-board an aircraft may have both the inertial sensor and a vibrational sensor, providing additive or redundant data that can be used by the PCB status unit. By predicting the health and performance of the PCB 104 through the one or more sensors 116, the PCB status unit 200 reduces unplanned downtime for performing corrective maintenance and/or replacement of the PCB 104.

The method 400 and the system 100 may be configured to measure specific subsets of stressors or components, and facilitate the identification of problematic stresses or components. For example, the method 400 or system may be configured to identify specific damage regions in PCBs 104 that occur due to external stressors. In another example, the method 400 or system may be configured to identify components with the highest failure rates and/or shortest life times. In another example, the method 400 and/or system 100 may be configured to determine mean-time-between-failure (MTBF) values for PCBs. For instance, the method 400 or system 100 may determine MTBF values through calculation of the inverse of the sum of various failure rates of PCB components.

The twinning module 208 may be configured to carry out a variety of analyses using the physics-based reliability model to predict specific failure aspects of the PCB. For example, the twinning module 208 may be configured to utilize the physics-based reliability model to predict PTH fatigue due to temperature cycling. In another example, the twinning module 208 may be configured to utilize the physics-based reliability model to predict solder joint fatigue under thermal cycling and the associated differences in the coefficient of thermal expansion (CTE) of dissimilar materials. In another example, the twinning module 208 may be configured to utilize the physics-based reliability model to predict vibration-induced solder joint fatigue. In another example, the twinning module 208 may be configured to utilize the physics-based reliability model to predict interconnect failure during mechanical shock (e.g., non-periodic physical loads causing displacement and deformation). In another example, the twinning module 208 may be configured to utilize the physics-based reliability model to calculate the mean time between failure (MTBF) or the mean time to failure (MTTF). It should be understood that baseline failure rates can be adjusted to account for applied external stressors such as electrical voltage, temperature, humidity, dust environment, etc.

The twinning module 208 may be configured to use empirical reliability prediction models to determine the reliability of current PCB technology based on failure rates of similar PCB technologies deployed in the field. This process has been standardized in the electronics industry through established government and commercial handbooks, such as through the handbook MIL-HDBK-217, which has been incorporated by reference in its entirety.

Figure 7:
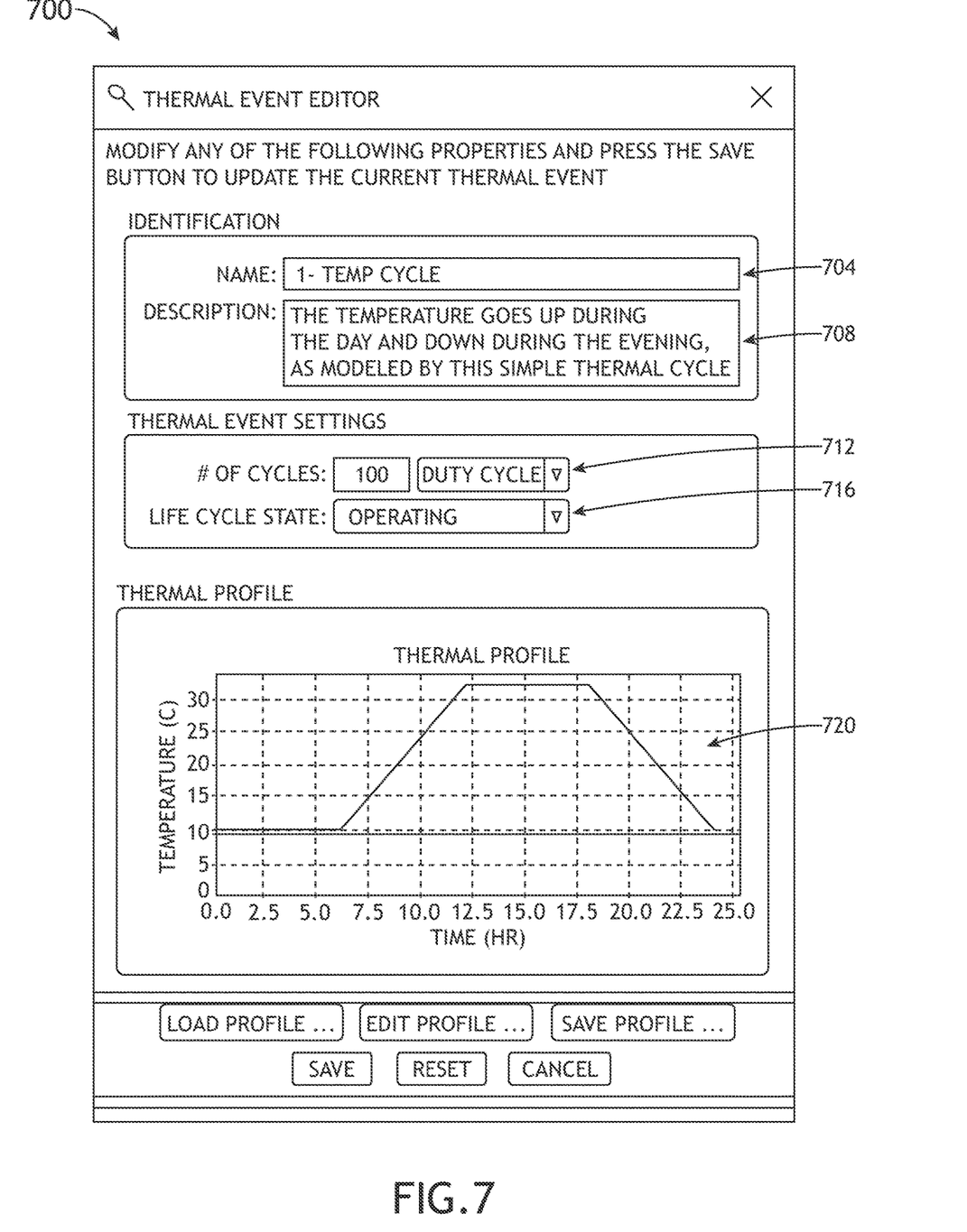
FIG. 7 is a drawing illustrating a graphic user interface (GUI) for inputting virtual stressors, in accordance with one or more embodiments of the disclosure.

In some embodiments, the system 100 may include a test mode that allows virtual stressors to be applied to the physics-based reliability model in generating the real-time failure prediction signal. For example, a user may input a quantitated stress that the twinning module 208 used for generating the real-time failure prediction signal. A snapshot of a user GUI 700 for inputting a quantitated stress is illustrated in FIG. 7, in accordance with one or more embodiments of the disclosure. The user GUI 700 displays the name 704 of the inputted stress (e.g., "time cycle"), a description 708 of the inputted stress (e.g., "The temperature cycling between high and low as modeled by this simple thermal cycle"), a number 712 of cycles of the inputted stress (e.g., 100) a life-cycle state of the inputted stress 716 (e.g., "operating") and a graphic profile 720 of the inputted stress. The test mode may be performed in the absence of sensor data (e.g., for predicting the failure rate of a new PCB 104 or a new design of a PCB 104) or in the presence of sensor data. For example, a user may use the test mode to predict how well a currently operating PCB would perform upon an increase in operation (e.g., from 12 hours a day to 24 hours a day). In another example, a user may want to use the test mode to predict how well a currently operating PCB would perform under extreme temperature cycling condition. The test mode may also be further implemented in the method 400 as a step 480 of receiving virtual test data and generating a real-time failure prediction signal based on the physics-based reliability model and the assumed test data.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is as follows:

1. A system comprising:
a circuit board: comprising:
one or more circuits; and
one or more sensors configured to detect an internal condition or an external condition and generate sensor data, wherein the circuit board is configured to transmit the sensor data; and
a status prediction unit communicatively coupled to the one or more sensors comprising:
one or more processors; and
a memory communicatively coupled to the one or more processors, having instructions stored therein that, when executed by the one or more processors, cause the status prediction unit to:
receive sensor data and historical conditional data, wherein the historical condition data includes known failure data of one or more components of the circuit board based on the internal condition or the external condition;
generate a physics-based reliability model informed by inputs from the sensor data and the historical conditional data;
generating a real-time failure prediction signal based on the physics-based reliability model; and
report the real-time failure prediction signal.

2. The system of claim 1, wherein the instructions, when executed by the one or more processors, further cause the status prediction unit to receive virtual test data and generating a real-time failure prediction signal based on the physics-based reliability model and the virtual test data.

3. The system of claim 1, further comprising a twinning module configured to generate the physics-based reliability model, wherein the physics-based reliability model is formed from the sensor data and the historical conditional data via a machine learning technique.

4. The system of claim 1, wherein the circuit board is configured as an additively manufactured printed circuit board, wherein the sensor data includes humidity data.

5. The system of claim 1, wherein the real-time prediction signal predicts a corrosion of a line of conductive ink on an additively manufactured printed circuit board.

6. The system of claim 1, wherein one or more components of the status prediction unit is disposed on the circuit board.

7. The system of claim 1, wherein the circuit board is configured as a printed circuit board.

8. The system of claim 7, wherein the printed circuit board is configured as an additively manufactured printed circuit board.

9. The system of claim 8, wherein the real-time failure prediction signal predicts a failure of a component of the additively manufactured printed circuit board.

10. The system of claim 9, wherein the real-time prediction signal predicts a corrosion of a line of conductive ink on the additively manufactured printed circuit board.

11. The system of claim 1, wherein the sensor data includes at least one environmental stressor data, wherein one of the at least one environmental stressor data includes temperature data, random vibration data, harmonic vibration data, mechanical shock data, high-cycle fatigue data, low-cycle fatigue data, and humidity data.

12. The system of claim 1, wherein the physics-based reliability models represent established empirical correlations and historical failure rate data executed via machine learning (ML) algorithms.

13. The system of claim 1, wherein the real-time failure prediction signal is generated in part via physics of failure (PoF) models.

* * * * *